Patented Jan. 14, 1941

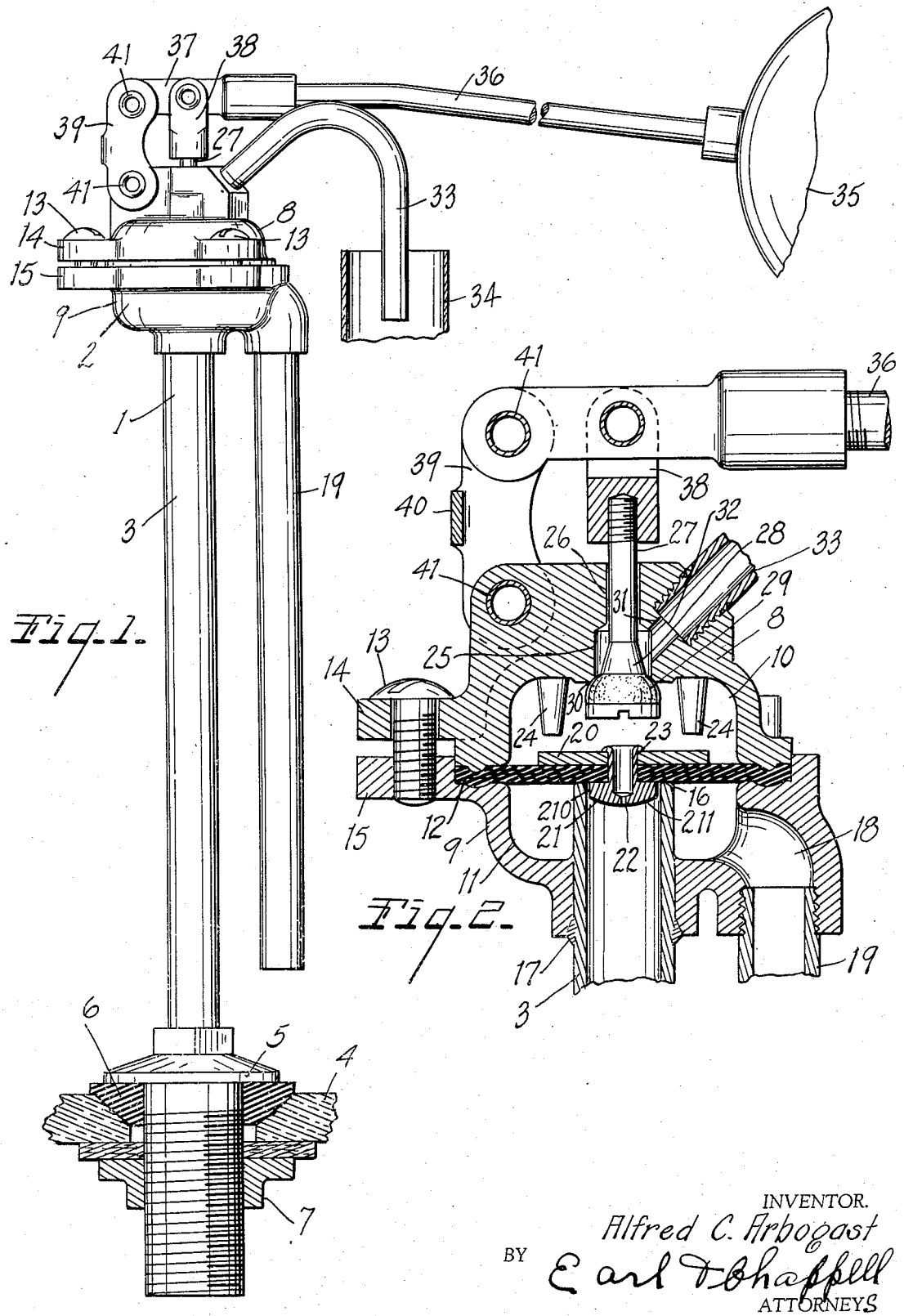

2,228,552

UNITED STATES PATENT OFFICE 2,228,552

VALVE FOR FLUSHING TANKS

Alfred C. Arbogast, Elkart, Ind., assignor to Northern Indiana Brass Company, Elkhart, Ind., a corporation of Indiana Application February 27, 1939, Serial No. 258,655

12 Claims. (Cl. 137—104)

This invention relates to improvements in valves for flushing tanks.

The main objects of this invention are:

First, to provide an improved ball cock or valve for a flushing tank, characterized by its rapidity and silence in action.

Second, to provide a valve of the type described, wherein wear on the parts incident to the valve closing action is reduced to a minimum.

Third, to provide a valve of the type described having provisions for maintaining the same fully open or fully closed at all times, to thereby minimize deterioration of the same due to an erosive or wire drawing effect adjacent the valve seat.

Fourth, to provide a valve of the type described, which is not likely to become inoperative due to clogging or erosion of the parts.

Fifth, to provide a valve of the type described, which is exceedingly simple and compact in construction and capable of being produced at relatively slight cost.

Objects relating to details and economies of the invention will appear from the description to follow. The invention is defined in the claims.

A preferred embodiment of the invention is illustrated in the accompanying drawing, wherein:

Fig. 1 is a view in side elevation partially broken away and in vertical section illustrating a valve in accordance with the invention in assembled position relative to a flushing tank.

Fig. 2 is an enlarged fragmentary view in vertical central section, more clearly illustrating details of the construction.

Referring to the drawing, the reference numeral 1 in general indicates the valve of my invention, which consists of a valve casing 2 connected to and in communication at its lower side with an upright supply pipe 3. The said pipe is provided with means to hold the same and the valve attached thereto in upright position in a flushing tank, a portion of which is designated 4, in the form of a flanged annular abutment 5 on the pipe coacting with a resilient gasket 6 disposed in a bottom opening in the tank. A suitable fitting on the pipe has a retaining nut 7 threaded thereon to hold the parts in place.

The casing 2, as is clearly illustrated in Fig. 2, is made up of top and bottom members 8, 9, respectively, each of which is provided with a chamber designated 10, 11, respectively. The chambers are separated by a flexible diaphragm valve 12 clamped between the members 8 and 9. The casing member 9 has an annular recess surrounding the chamber 11 to provide a seat for the diaphragm and the top casing member 8 has a depending shoulder fitting into the recess to clamp the diaphragm between the two housing members, as clearly illustrated in Fig. 2. The casing members are secured together and clamped upon the diaphragm by screws 13 passing through apertured ears 14 on the top member 8 and threaded into similar ears 15 in the bottom member 9.

The supply pipe 3 extends vertically substantially into the lowermost chamber 11 to provide a supply nozzle and the upper end of this nozzle constitutes a valve seat. As a matter of fact, this valve seat or the plane of the upper end or discharge port 16 of the pipe is coincident with the plane of the lowermost side of the diaphragm when the latter is in normal relaxed horizontal position. In this position, the diaphragm functions to close the port. The pipe 3 is sweated to the lowermost casing member 9 as indicated at 17 to hold the parts in this relation. It should be observed that the area of opening of pipe 3 is much less than the area of the diaphragm. This makes possible a large differential of force to thrust the diaphragm into closing relation to the pipe under certain conditions to be hereinafter explained.

The bottom casing member has a discharge port 18 which is tapped to threadedly receive a discharge tube 19 for communication with the lower chamber 11.

The flexible diaphragm 12 has centrally associated therewith a rigid back plate or disk 20 and the disk and diaphragm are secured together by a hollow rivet-like by-pass and cushioning member or button 21 of hard, wear and erosion resistant material, such as Monel metal, provided with a small orifice 22 on the lowermost side thereof. I have obtained very desirable results with a diameter in the neighborhood of .025 inch to .030 inch. It should be understood that this may be varied with satisfactory results. The stem of this part is counterbored at 23 on the uppermost side thereof to place this orifice in communication with chamber 10.

This element 21 performs a number of functions in addition to that of securing the diaphragm 12 and disk 20 together, which functions will be hereinafter referred to in particular. It should be noted, however, that the said element has a flat vertical annular periphery 210 and a gradually rounded bottom face 211 concentric with the orifice 22 which serves to radially deflect water rising in the intake tube 3 and impinging the same and thus minimizes the likelihood of orifice 22 becoming clogged or eroded by small solid particles or impurities in water in the supply pipe.

There is a very small clearance between the periphery 210 of element 21 and the interior of the valve seat 16, say of the order of .005 inch. No attempt has been made to reproduce the relative dimensions of the parts exactly in the drawing. The function of this small clearance in the concentric telescoping reception of pipe 3 and button element 21 will be hereinafter referred to.

The upper casing member 8 carries a plurality of integral stop lugs 24 depending into the chamber 10 and serving to limit the upward movement of the diaphragm 12 and disk 20 by engaging the latter. Furthermore, the member 8 has formed therein a central fluid passage 25 and a concentric guide opening 26 for the stem 27 of a vertically reciprocable bleeder or control valve 28. This valve 28 has a resilient facing 29 adapted to engage with a valve seat or opening 30 at the junction of passage 25 with the upper chamber 10. The valve facing 29 is preferably of rubber or synthetic rubber and is in the form of an annular ring engaged in a suitable annular recess formed in the valve element adjacent the enlarged free end thereof.

An angularly arranged counterbored passage 31 communicates with fluid passage 25 and is tapped at 23 to receive a refill tube 33 through which chamber 10 is bled when the valve seat 30 is open and which discharges to an upright overflow pipe 34 as illustrated in Fig. 1. The construction, function, and arrangement of the refill tube and overflow pipe are well known and therefore will not be enlarged upon here.

The valve 28 is under the control of the flushing tank float 35 on an actuating arm 36. This arm is threaded to a connector 37 having a forked valve actuating yoke 38 pivoted thereto, the said yoke having threaded engagement with the end of the stem 27 of control valve 28 projecting from the housing 2. The connector 37 is pivoted to one end of a link 39 which, in the interest of economy of construction, is in the form of a sheet metal stamping bent to U-shape, the parallel arms of which are connected by an integral cross strap 40. The other end of this link is pivoted to a relatively thin extension on the top casing member 8.

The aforementioned pivotal connections are made by means of a hollow rivets 41 extending through the pivoted parts and constituting extremely inexpensive though entirely satisfactory connecting elements.

In operation, when the flushing tank 4 is emptied, control valve 28 travels downwardly, opening the passage 25 to the upper chamber 10 and, by decreasing the pressure in that chamber, permitting the diaphragm valve 12 to be lifted by water flowing upwardly in the supply pipe 3, thence out through the chamber 11 and discharge tube 19. When the tank refills, the float 35 rises, elevating the valve 28. At all times when the valve packing 29 is separated from the valve seat 30, the fluid displaced into chamber 10 through the small orifice 22 in element 21 is at atmospheric pressure and accordingly the force of upwardly flowing water impinging the diaphragm is sufficient to maintain the disk 20 thereon against the stops 24. This condition obtains until practically the very instant when the packing 29 actually engages and seals valve seat 30, due to the fact that an extremely minute annular space between the said packing and seat suffices to accommodate a flow of water therethrough equal to that traversing the fine by-pass orifice 22. However, when the packing 29 closes against the seat 30, it will be apparent that, due to the large differential between the area of the diaphragm subjected to the pressure in chamber 10 and the relatively small area of the diaphragm subjected to the force of the upwardly flowing stream in tube 3, a very slight increase in pressure in chamber 10 arising because of the closing of valve 28 is sufficient to force the diaphragm rapidly downwardly into closing relation to the discharge port at the upper end of that tube.

It is desired to emphasize the importance of this extremely sensitive response made possible by the small orifice 22 in conjunction with the large differential in force effective on opposite sides of the diaphragm by reason of the relatively small discharge port 16. It permits the diaphragm to remain fully elevated with a maximum discharge of water through chamber 11 until the actual instant when the float closes control valve 28. Then the diaphragm travels immediately downward to shut off flow in pipe 3. In hitherto known installations, there has been a tendency for the pressure in the upper chamber to build up so gradually that the diaphragm or corresponding element was forced down quite gradually, slowly restricting the valve intake opening. This inevitably results in a wire drawing effect at this annular opening, with serious erosion, which in turn produces faulty operation and leakage. These objections are completely eliminated in my construction, for the diaphragm, because of the provisions noted above, has a practically instantaneous movement from fully open to practically entirely shut-off position.

A number of functions of the element 21 have been referred to; namely, it secures the diaphragm 12 and disk 20 together and carries the by-pass orifice 22 while at the same time, because of its rounded lower surface, preventing clogging of the orifice. A further function of this element is, however, of even greater importance than those mentioned, namely, its function of eliminating noise during operation of the valve.

Due to the small clearance between the sides of the element and the inner wall of the tube 3 adjacent the open end of pipe 3, it will be apparent that the element 21 strikes the water in the tube immediately prior to engagement of the pipe by the diaphragm element. This cushions the diaphragm, effectively preventing the occurrence of a water hammer such as characterizes practically all known valves wherein the operation relies on the sudden closure of two coacting elements. In my device, the diaphragm travels downwardly extremely rapidly until the element 21 enters the upper end of the pipe. At this point, it strikes the column of water in the tube as 3 has been noted and the additional resistance causes the diaphragm to travel somewhat more slowly for the rest of its throw to fully closed position against the seat 16. Of course, notwithstanding an extremely small escape of fluid upwardly between the side of element 21 and the pipe, the flow of an appreciable quantity of fluid past the seat 16 is terminated when the element 21 impinges the water and in the final position illustrated in Fig. 2, which is assumed immediately thereafter, the diaphragm prevents all leakage. I am unaware of any presently known flushing tank which is characterized by the rapidity of action of my construction in cutting off flow in the supply pipe, with an equivalent freedom from wire drawing action and/or very substantial and objectionable noisiness.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a valve for a flushing tank, a casing having a diaphragm valve therein separating the casing into main fluid flow and control chambers, said diaphragm valve having an erosion resistant element thereon projecting into the main flow chamber, a supply pipe secured to said casing and discharging through a port disposed in said main chamber in position to telescopically receive said element and to be engaged and closed by said diaphragm valve, said element having an orifice therein of a diameter of approximately .025 to .030 inch communicating the chambers and having an inclined face surrounding said orifice for laterally deflecting solid particles in the water discharged against the element through said port, to thereby prevent clogging of the orifice, said main flow chamber having a discharge passage and said control chamber having a valve controlled opening for governing the pressure therein, said orifice permitting flow of fluid from said main chamber and port to said control chamber, and the increased pressure in said control chamber when said opening is closed causing the valve to be urged to closing position relative to the port, said orifice being sufficiently small so that the displacement of the diaphragm valve is delayed until said opening is actually closed.

2. In an automatic valve, a casing having a diaphragm valve therein separating the casing into main flow and control chambers, said diaphragm valve having a cushioning element thereon projecting into the main flow chamber, a supply pipe discharging through a port disposed in the main chamber thereof in position to telescopingly receive said element and to be engaged and closed by said diaphragm valve, said valve having a small orifice therein communicating the chambers, the approximate ratio of the telescoping clearance between said cushioning element and the inner wall of the port to the diameter of the orifice being of the order of $$\frac{.005}{.025-.030}$$

to enable the element to contact the fluid in the port prior to engagement of the diaphragm with the port to substantially cut off the flow of fluid in the pipe and cushion the diaphragm in engaging the port, the area of said element when telescoped within the port being substantially equal to the area of the port whereby substantially the entire pressure exerted on the diaphragm valve through said supply pipe is applied to said element, the area of the diaphragm valve exposed in the control chamber being relatively large compared to the area of said element, said main flow chamber having a discharge passage and said control chamber having a valve controlled opening for governing the pressure therein, said orifice permitting the flow of fluid from said main chamber and port to said control chamber, and the increased pressure in said control chamber when said opening is closed causing the diaphragm valve to be rapidly urged to closing position relative to the port due to the large differential between the area of the diaphragm valve exposed to the control chamber and the area of the element.

3. In an automatic valve, a casing having a diaphragm valve therein providing a main fluid flow chamber in the casing, a supply pipe having a discharge port in said chamber positioned to be engaged and controlled by said valve, a discharge passage for said fluid flow chamber, said casing having a control chamber on the opposite side of said diaphragm valve, and a bleeder opening in said control chamber and a float controlled valve therefor for controlling the pressure in said last named chamber, the fluid pressure on the diaphragm valve in said control chamber being insufficient when said bleeder opening is open to counteract the force of fluid impinging the diaphragm valve from the port, said diaphragm valve having a cushioning element secured thereto to telescope with said port with a clearance between the element and port of approximately .005 inch, whereby the element first contacts the fluid in the port during the movement of the diaphragm valve toward the port to substantially shut off flow through the port and cushion the subsequent engagement of the diaphragm valve with the port, substantially the entire pressure of the fluid in the supply pipe being exerted on said element when it is telescoped in the port, said diaphragm valve having an extremely fine orifice therein opening to the opposite sides thereof, the area of the port and element being relatively small compared to the area of the diaphragm valve exposed to the control chamber on the opposite side thereof, whereby closing of the diaphragm valve under the force of pressure in said last named chamber is delayed, by reason of the fineness of said orifice, until said float controlled valve actually closes said bleeder opening, and is then effected with rapidity due to the large differential in area of the port and diaphragm valve.

4. In an automatic valve, a casing having a main fluid flow chamber, a fluid pressure responsive member mounted for movement in said casing under the influence of fluid therein, a supply pipe connected to said housing and discharging through a port in said chamber positioned to be engaged and closed by said member, a discharge passage for said main fluid flow chamber, said casing having a control chamber on the opposite side of said member from said main flow chamber, a bleeder opening in said control chamber, and a float controlled valve therefor for controlling the pressure in said last named chamber, said pressure responsive member being exposed to pressure in said control chamber and to fluid flowing in said port, and the fluid pressure in said control chamber being insufficient when said bleeder opening is open to counteract the force of fluid impinging the member from the port, so that the member is held thereby in spaced relation to the port, said member having a cushioning element secured thereto to telescope within said port with very small clearance between the element and port whereby the element first contacts the fluid in the port during the movement of the member toward the port to substantially shut off flow through the port and cushion the engagement of the member with the port, substantially the entire fluid pressure exerted on said pressure responsive member by fluid in said supply pipe being applied to said element, said element having a very restricted orifice therein opening to the chambers on opposite sides of the member for flow of fluid from said main chamber and port to said control chamber, and having a gradually rounded face adjacent said orifice exposed to fluid flowing through said port to deflect solid particles in the fluid radially away from the orifice, the area of the port and element being relatively small compared to the area of the member exposed to the control chamber on the opposite side thereof, whereby closing of the member against the port under the force of fluid pressure in the control chamber is delayed, by reason of the small size of said orifice, until said float controlled valve actually closes said bleeder opening, and is then effected with rapidity due to the large differential in area of the element and member.

5. In an automatic valve, a casing having a main fluid flow chamber, a fluid pressure responsive member mounted for movement in said casing under the influence of fluid therein, a supply-pipe connected to said casing and discharging through a port in said chamber positioned to be engaged and closed by said member, a discharge passage for said main fluid flow chamber, said casing having a control chamber on the opposite side of said member from said main flow chamber, a bleeder opening in said control chamber, and a valve therefor for controlling the pressure in said last named chamber, said pressure responsive member being exposed to pressure in said control chamber and to fluid flowing in said port, and the fluid pressure in said control chamber being insufficient when said bleeder opening is open to counteract the force of fluid impinging the member from the port, so that the member is held thereby in spaced relation to the port, said member having a cushioning element secured thereto to telescope within said port with extremely small clearance between the element and port, the area of the port and element being substantially equal whereby the element first contacts the fluid in the port during the movement of the member toward the port to substantially shut off flow through the port and cushion the engagement of the member with the port, the entire pressure of the fluid at the port being exerted on said element, said element having a very restricted orifice therein opening to the chambers on opposite sides of the member for flow of fluid from said main chamber and port to said control chamber, the area of the cushioning element and port being relatively small compared to the area of the member exposed to the control chamber on the opposite side thereof, whereby closing of the member against the port under the force of fluid pressure in the control chamber is delayed, by reason of the small size of said orifice, until said valve actually closes said bleeder opening, and is then effected with rapidity due to the large differential in area of the element and member.

6. In a valve for a flushing tank, a casing having a diaphragm valve therein separating the casing into main fluid flow and control chambers, said diaphragm valve having an element of wear and erosion resistant material thereon projecting into the main chamber, a supply nozzle extending into the main chamber in position to internally receive said element and to provide a seat for said valve, said element having an orifice therein of a diameter of approximately .025 to .030 in. permitting flow of fluid from said main chamber to said control chamber and having a gradually rounded face surrounding said orifice and facing said pipe for radially deflecting solid particles in the fluid discharged from the pipe and impinging the element, to thereby prevent clogging of the orifice, the clearance between said element and the inner wall of the nozzle being of the order of .005 inch, whereby the element engages the fluid in the pipe prior to engagement of the pipe by the diaphragm to thereby substantially terminate flow of fluid in the pipe and cushion the diaphragm in engaging the nozzle, substantially the entire pressure of fluid in the supply nozzle being applied to said element, said casing having a discharge passage in communication with said main chamber and an opening for providing communication between said control chamber and a refill tube, and a float controlled valve for controlling said opening, said float controlled valve in closing said port causing the pressure in said control chamber to be increased sufficiently to seat the diaphragm valve, said orifice being sufficiently small so that the increase of said pressure to a point sufficient to displace the diaphragm valve is delayed until said opening is actually closed by said contact with the float controlled valve, the area of said diaphragm valve exposed to said control chamber being substantially larger than the area of said element whereby the closing of the diaphragm valve is effected with great rapidity.

7. In an automatic valve, a casing having fluid flow and control chambers, a diaphragm mounted on the casing and separating the chambers, said flow chamber having a supply port and a discharge opening therein, said diaphragm carrying a cushioning element telescoping within said supply port and adapted to engage liquid in the latter prior to final closure of the diaphragm thereover to eliminate water hammer, said cushioning element having an orifice extending therethrough of relatively small diameter, the axial length of said orifice being relatively small compared to the axial dimension of said cushioning element to prevent clogging of the orifice, said element having an inclined surface surrounding the orifice to further prevent said clogging, stops disposed in said control chamber to engage and limit the travel of said diaphragm and float controlled means in said control chamber to govern the discharge of liquid admitted thereto through said orifice whereby to control the pressure acting on the control chamber side of the diaphragm.

8. In an automatic valve, a casing having fluid flow and control chambers, a diaphragm mounted on the casing and separating the chambers, said flow chamber having a supply port and a discharge opening therein, said diaphragm carrying a cushioning element telescoping within said supply port and adapted to engage liquid in the latter prior to final closure of the diaphragm thereover to eliminate water hammer, said cushioning element having an orifice extending therethrough of relatively small diameter, the axial length of said orifice being relatively small compared to the axial dimension of said cushioning element to prevent clogging of the orifice, said element having an inclined surface surrounding the orifice to further prevent said clogging, and float controlled means in said control chamber to govern the discharge of liquid admitted thereto through said orifice whereby to control the pressure acting on the control chamber side of the diaphragm.

9. A valve of the type described comprising a casing having a diaphragm therein and a port opening to one side of the diaphragm, said diaphragm being engageable with said port for closing the same and having a cushioning element telescoping in the port and having small clearance therein, said element having a restricted orifice therethrough for providing communication between the opposite sides of the diaphragm, the diameter of said orifice and the clearance between said element and port being in the approximate ratio of .025–.030 inch diameter to .005 inch clearance, said element having a rounded surface concentric with the orifice on the side thereof facing the port and having a cylindrical side wall disposed between the periphery of said surface and the diaphragm whereby the element first engages liquid in the port to substantially cut off flow at the port and to thereafter cushion the diaphragm in seating against the port without water hammer, there being a valve controlled chamber on the side of the diaphragm opposite the element for regulating the pressure exerted on said opposite side of the diaphragm.

10. A valve of the type described comprising a casing having a diaphragm therein and a port opening to one side of the diaphragm, said diaphragm being engageable with said port for closing the same and having a cushioning element telescoping in the port and having small clearance therein, said element having a restricted orifice therethrough for providing communication between the opposite sides of the diaphragm, the diameter of said orifice and the clearance between said element and port being in the approximate ratio of .025–.030 inch diameter to .005 inch clearance, said element having an inclined surface concentric with the orifice on the side thereof facing the port and having a cylindrical side wall disposed between the periphery of said surface and the diaphragm whereby the element first engages liquid in the port to substantially cut off flow at the port and to thereafter cushion the diaphragm in seating against the port without water hammer.

11. A valve for a flushing tank comprising a casing having a diaphragm dividing the same into liquid flow and control chambers, said flow chamber having a port for communication with a liquid supply source, and a cushioning element secured to said diaphragm to telescope within said port with small clearance whereby substantially the entire liquid pressure exerted on the diaphragm by liquid at said port is applied to said element, said element having a restricted orifice extending therethrough and through the diaphragm to provide communication between the opposite sides of the diaphragm, the dimensions of said clearance and the cross sectional area of the orifice being in the approximate ratio of .005 inch clearance to .025–.030 inch diameter of the port whereby the element first engages liquid in the port prior to engagement of the port by the diaphragm to thereby initially substantially terminate flow of liquid in the pipe and cushion the diaphragm in engaging the port without hammer, said control chamber having a bleeder opening therein and a valve for controlling said opening, the area of said diaphragm exposed to said control chamber being substantially greater than the area of the element exposed to liquid at the port whereby the port is maintained fully open until said opening is substantially closed by the last named valve and is then closed by the diaphragm with great rapidity.

12. A valve for a flushing tank comprising a casing having a diaphragm therein and a port for communication with a liquid supply source, and a cushioning element secured to said diaphragm to telescope within said port with small clearance whereby substantially the entire liquid pressure exerted on the diaphragm by liquid at said port is applied to said element, said element having a restricted orifice extending therethrough and through the diaphragm to provide communication between the opposite sides of the diaphragm, the dimensions of said clearance and the cross sectional area of the orifice being in the approximate ratio of .005 inch clearance to .025–.030 inch diameter of the port whereby the element first engages liquid in the port prior to engagement of the port by the diaphragm to thereby initially substantially terminate flow of liquid in the pipe and cushion the diaphragm in engaging the port without hammer.

ALFRED C. ARBOGAST.